(12) United States Patent
Young, III et al.

(10) Patent No.: US 9,744,946 B2
(45) Date of Patent: Aug. 29, 2017

(54) WINDSCREEN WIPER DEVICE

(71) Applicant: Federal-Mogul Motorparts Corporation, Southfield, MI (US)

(72) Inventors: William D. Young, III, Waterford, MI (US); Dennis E. Cox, Belleville, MI (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 285 days.

(21) Appl. No.: 14/710,745

(22) Filed: May 13, 2015

(65) Prior Publication Data

US 2015/0329087 A1 Nov. 19, 2015

Related U.S. Application Data

(60) Provisional application No. 61/992,621, filed on May 13, 2014.

(51) Int. Cl.
  *B60S 1/40* (2006.01)
  *B60S 1/38* (2006.01)

(52) U.S. Cl.
  CPC ............ *B60S 1/4003* (2013.01); *B60S 1/381* (2013.01); *B60S 1/4045* (2013.01); *B60S 1/3863* (2013.01); *B60S 1/3868* (2013.01); *B60S 1/4048* (2013.01); *B60S 1/4067* (2013.01); *B60S 2001/4051* (2013.01); *B60S 2001/4054* (2013.01)

(58) Field of Classification Search
  CPC ...... B60S 1/4003; B60S 1/387; B60S 1/4045; B60S 1/4048; B60S 2001/4051; B60S 2001/4054

USPC ...................................................... 15/250.32
See application file for complete search history.

(56) References Cited

U.S. PATENT DOCUMENTS

| | | | |
|---|---|---|---|
| D597,468 S | 8/2009 | Grasso et al. |
| 8,166,605 B2 | 5/2012 | Lee |
| D665,329 S | 8/2012 | Houssat et al. |
| D665,718 S | 8/2012 | Houssat et al. |
| 8,438,692 B2 | 5/2013 | Ollier |
| 8,505,151 B2 | 8/2013 | Depondt et al. |

(Continued)

FOREIGN PATENT DOCUMENTS

DE  202012102614 U1  8/2012

OTHER PUBLICATIONS

International Search Report, mailed Sep. 2, 2015 (PCT/US2015/030482).

*Primary Examiner* — Gary Graham
(74) *Attorney, Agent, or Firm* — Robert L. Stearns; Dickinson Wright, PLLC

(57) ABSTRACT

The wiper device includes a connecting assembly with a base and a joint part. The joint part is made as one integral piece and includes a main body portion and a nose portion. The main body portion is generally extends longitudinally from a front end to a back end and has a top and a pair of sides. A resilient tongue is formed into the top and has a button. The nose portion is connected with the front end of the main body portion at a resilient hinge and includes a pair of locking tangs that are spaced vertically from the resilient hinge. A pair of locking lugs extend from the back end of the main body portion opposite of the nose portion. The sides of the main body portion present a pair of ledges which are spaced vertically from one another to present a groove between said ledges.

15 Claims, 5 Drawing Sheets

(56) References Cited

U.S. PATENT DOCUMENTS

| | | |
|---|---|---|
| D706,201 S | 6/2014 | Depondt |
| 8,782,846 B2 | 7/2014 | Schaeuble et al. |
| 8,959,701 B2 * | 2/2015 | Kim .................. B60S 1/387 |
| | | 15/250.32 |
| D725,022 S | 3/2015 | Poton |
| D725,024 S | 3/2015 | Poton |
| 9,260,084 B2 * | 2/2016 | Polocoser ............ B60S 1/3849 |
| 2009/0307862 A1 | 12/2009 | Boland |
| 2010/0000041 A1 * | 1/2010 | Boland ................ B60S 1/3868 |
| | | 15/250.32 |
| 2010/0186184 A1 | 7/2010 | Lee |
| 2010/0205763 A1 | 8/2010 | Ku |
| 2012/0246859 A1 | 10/2012 | Schaeuble et al. |
| 2013/0104334 A1 | 5/2013 | Depondt |
| 2013/0152326 A1 * | 6/2013 | Oslizlo .................. B60S 1/387 |
| | | 15/250.33 |
| 2013/0167317 A1 | 7/2013 | Oslizlo et al. |
| 2013/0340194 A1 | 12/2013 | Depondt |
| 2014/0000057 A1 | 1/2014 | Genet |
| 2014/0026350 A1 | 1/2014 | Boland |
| 2014/0082877 A1 | 3/2014 | Boudjenah et al. |
| 2014/0082878 A1 | 3/2014 | Boland |
| 2014/0215747 A1 | 8/2014 | Yang et al. |
| 2014/0259504 A1 | 9/2014 | Piotrowski et al. |
| 2014/0325786 A1 | 11/2014 | Verelst et al. |

* cited by examiner

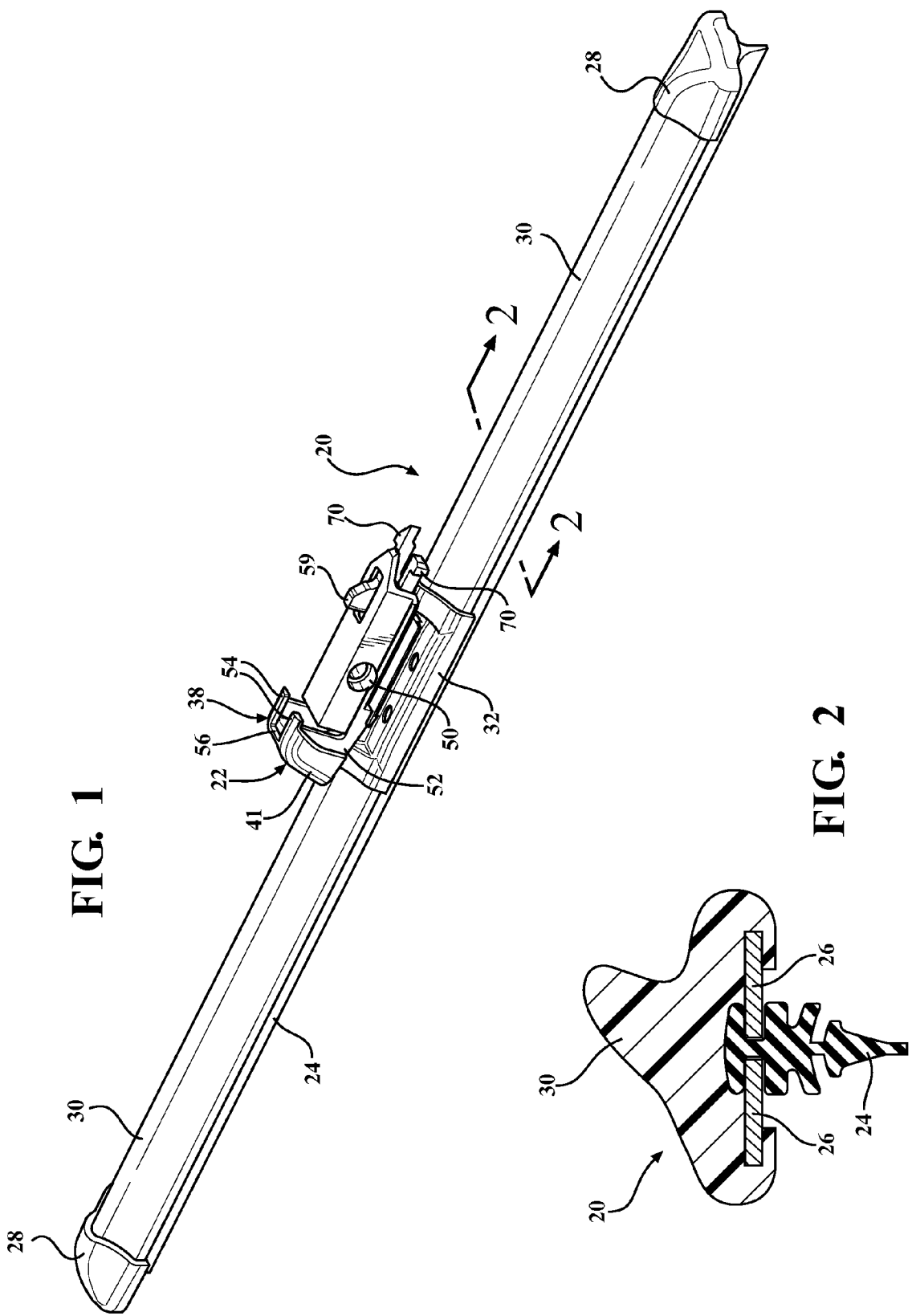

WINDSCREEN WIPER DEVICE

CROSS-REFERENCE TO RELATED APPLICATION

This application claims the benefit of U.S. Provisional Patent Application Ser. No. 61/992,621, filed May 13, 2014, entitled "Windscreen Wiper Device With a Universal Connector", the entire disclosure of the application being considered part of the disclosure of this application and hereby incorporated by reference.

BACKGROUND OF THE INVENTION

1. Field of the Invention

The present invention is related to windscreen wiper devices, or wiper blade assemblies, and more precisely, to connector assemblies for connecting wiper blade assemblies to different types of wiper arms.

2. Related Art

Passenger vehicles may have any one of a range of different styles of oscillating wiper arms including, for example, various sizes of hook-style wiper arms, pin-style wiper arms, bayonet-style wiper arms and rock lock-style wiper arms. Some of the most common styles of wiper arms are 9×3, 9×4×23, 9×4×28 and 9×4×33 sized hook-style wiper arms; 19 and 22 mm sized bayonet-style wiper arms; 19 mm, 22 mm, 3/16" and 1/4" sized cylindrical pin-style wiper arms; and two different sizes of rock lock-style wiper arms.

For both original equipment and aftermarket applications, wiper blade manufacturers typically manufacture wiper devices with connector assemblies which are either adapted only for attachment to one style of wiper arm or which include many pieces that must be in order to connect with more than one style of wiper arm. For example, some aftermarket wiper blade assemblies are sold as expendable articles with a connector assembly with interchangeable parts to allow the wiper blade assembly to be operably attached with two or more of the above-referenced types of wiper arms commonly found on vehicles.

SUMMARY OF THE INVENTION AND ADVANTAGES

One aspect of the present invention provides for a windscreen wiper device. The windscreen wiper device includes a longitudinally extending wiper blade of an elastic material for sealing against a windscreen. A carrier element operatively supports and biases the wiper blade into a pre-curved configuration. A connecting assembly is further provided and includes a base which is engaged with at least one of the wiper blade and the carrier element. The connecting assembly additionally includes and a joint part which is pivotally connected with the base and is adapted to directly secure with a range of different styles of oscillating wiper arms. The joint part is made as one integral piece and includes a main body portion and a nose portion. The main body portion is generally U-shaped in cross-section and extends longitudinally from a front end to a back end and has a top and a pair of sides. A resilient tongue is formed into the top and has a button which protrudes upwardly therefrom for engaging within an opening of a bayonet-style wiper arm. The nose portion is hingedly connected with the front end of the main body portion at a resilient hinge and includes a pair of locking tangs that are spaced vertically from the resilient hinge for lockingly engaging a front edge of at least one style of a top lock-style wiper arm. A pair of locking lugs extend from the back end of the main body portion opposite of the nose portion for receiving legs of the top lock-style wiper arm. The sides of the main body portion present a pair of ledges which are spaced vertically from one another to present a groove between said ledges.

The windscreen wiper device is advantageous because the two-piece connecting assembly is able to lockingly and detachingly engage with a wide range of different styles of wiper arms without any interchangeable parts. This leads to cost savings through economies of scale since the same pieces can be employed for use with a more diverse range of wiper arms.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 is an isometric view of an exemplary embodiment of a windscreen wiper device;

FIG. 2 is a cross-sectional view of the windscreen wiper device taken along line 2-2 of FIG. 1;

DESCRIPTION OF THE ENABLING EMBODIMENT

Figure 3:
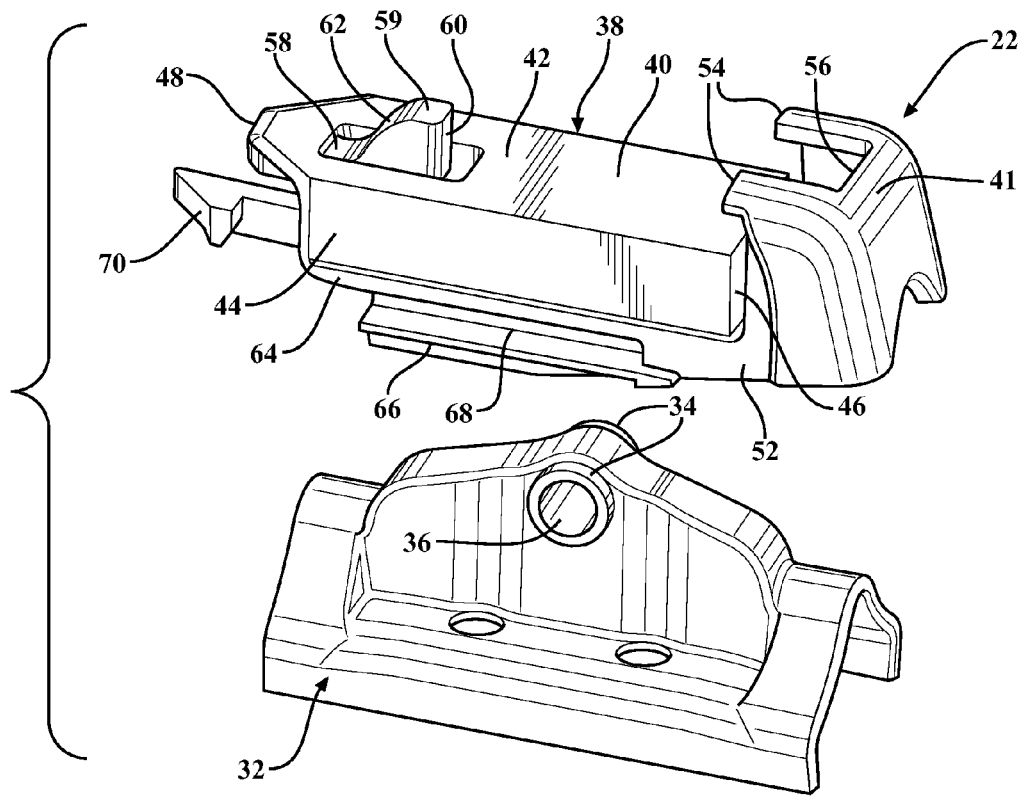
FIG. 3 is an exploded view of a connecting assembly of the windscreen wiper device of FIG. 1.

Referring to the Figures, wherein like numerals indicate corresponding parts throughout the several views, an exemplary embodiment of an improved windscreen wiper device 20 with a connecting assembly 22 that is configured for attachment to a range of different styles and sizes of oscillating wiper arms is generally shown in FIGS. 1 and 2. The windscreen wiper device 20 includes a longitudinally extending wiper blade 24 which is made of an elastic, flexible material for sealing against a windscreen (not shown) of a vehicle. The wiper blade 24 is operatively supported by a carrier element 26 which biases the wiper blade 24 into the pre-curved configuration shown in FIG. 1 for sealing the length of the wiper blade 24 along a curved windshield. In the exemplary embodiment, the wiper blade 24 includes a pair of laterally facing grooves, and the carrier element 26 includes a pair of flexors 26 which are operably received in the grooves. Neighboring ends of the flexors 26 are interconnected with one another via end caps 28, and a pair of sub-spoilers 30, which are constructed as separate pieces from one another, extend longitudinally from the connecting assembly 22 to the end caps 28.

Referring now to FIG. 3, the connecting assembly 22 includes a base 32 which is engaged with at least one of the wiper blade 24 and the carrier element 26. The base 32 includes a pair of laterally extending projections 34 which are axially aligned with one another. Each projection 34 has a circular shape to present an outer bearing surface. At least one of the projections 34 also includes a through hole 36 to present an inner bearing surface. The base 32 is preferably made as one integral piece of a polymeric material which is shaped through an injection molding process. However, it should be appreciated that the base 32 could be made of any suitable material and through any suitable process.

The connecting assembly 22 also includes a joint part 38, or an adapter, which is made as one integral piece of material and includes a main body portion 40 and a nose portion 41. The main body portion 40 is generally U-shaped in cross-section with a top 42 and a pair of sides 44 and extends longitudinally from a front end 46 to a back end 48. The sides 44 of the main body portion 40 extend vertically downwardly in spaced and parallel relationship with one another and transversely to the top 42. The sides 44 have axially aligned openings which are circular in shape and which receive the circular projections 34 of the base 32 to allow the joint part 38 to freely pivot relative to the base 32 about a pivot axis. On one of the sides 44 (shown in FIG. 1), the opening 50 extends completely through the main body portion 40, whereas the opening on the side 44 shown in FIG. 3 does not extend completely through the main body portion 40.

The nose portion 41 of the joint part 38 is integrally connected with the main body portion 40 at a resilient hinge 52. The resilient hinge 52 allows the nose portion 41 to be pivoted forwardly away from the main body portion 40. The nose portion 41 also includes a pair of upper locking tangs 54 which are spaced vertically from the resilient hinge 52 and are elevated relative to the top 42 of the main body portion 40 and extend rearwardly towards the main body portion 40. The upper locking tangs 54 are spaced laterally from one another on opposite sides of a U-shaped slot 56.

The top 42 of the main body portion 40 includes a resilient tongue 58 with a button 59 that protrudes upwardly therefrom. Specifically, the button 59 projects upwardly above the top 42 of the main body portion 40. The resilient tongue 58 is interconnected with the remainder of the top 42 adjacent the back end 48 and extends longitudinally towards the front end 46 of the main body portion 40. The button 59 on the resilient tongue 58 includes a vertical surface 60 which faces longitudinally towards the front end 46 of the main body portion 40 and a ramped surface 62 which faces longitudinally towards the back end 48. The combination of the vertical and ramped surfaces 60, 62 provides the button 59 with a shark fin-like shape.

Each of the sides 44 of the joint part 38 also includes two vertically spaced and longitudinally extending ledges 64, 66 and presents a groove 68 between the ledges 64, 66. Specifically, each side 44 includes an upper ledge 64 and a lower ledge 66, and each of the ledges 64, 66 has an upper surface and a lower surface.

The joint part 38 further includes a pair of locking lugs 70, or retention tabs, which extend laterally outwardly. In the exemplary embodiment, the locking lugs 70 are interconnected with the back end 48 of the main body portion 40 via a pair of longitudinally extending legs. Each locking lug 70 has a forwardly facing surface which slants upwardly and forwardly from a lower-most edge. The longitudinally extending legs are generally rigid.

Figure 4:
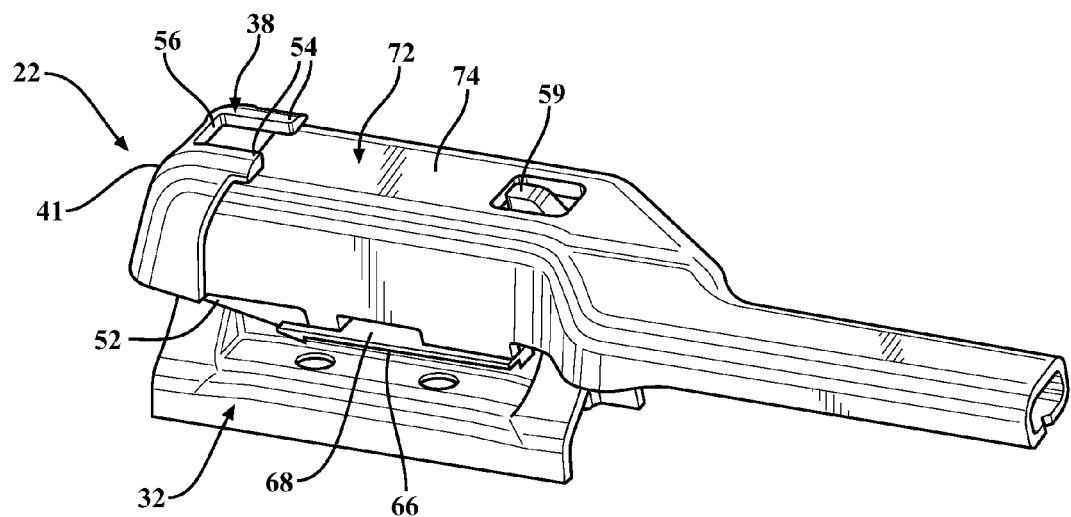
FIG. 4 is a perspective view of the connecting assembly engaged with a 19 mm bayonet-style wiper arm.

The single piece joint part 38 is configured for attachment with a range of different styles and sizes of oscillating wiper arms. Referring now to FIG. 4, the joint part 38 is shown in locking engagement with a 19 mm sized bayonet-style wiper arm 72. The 19 mm bayonet-style wiper arm 74 is engaged with the joint part 38 by aligning a pair of opposing and laterally inwardly extending legs on the wiper arm 72 with the groove 68 (shown in FIG. 3) between the ledges 64, 66 of the joint part 38 and sliding the joint part 38 rearwardly. The ramped surface 62 (shown in FIG. 3) of the button 59 causes the button 59 to automatically pivot downwardly when contacted by a front edge of the wiper arm 72. The button 59 then snaps upwardly into a hole on a top wall 74 of the wiper arm 72, to lockingly engage the joint part 38 with the wiper arm 72. As shown, when engaged with the 19 mm bayonet-style wiper arm 72, a top surface of the button 59 is generally flush with the top wall 74 of the wiper arm 72. The joint part 38 may be detached from the 19 mm bayonet-style wiper arm 72 by simply pressing the button 59 downwardly through the hole in the top wall 74 of the wiper arm 72 and sliding the joint part 38 forwardly and away from the wiper arm 72.

Figure 5:
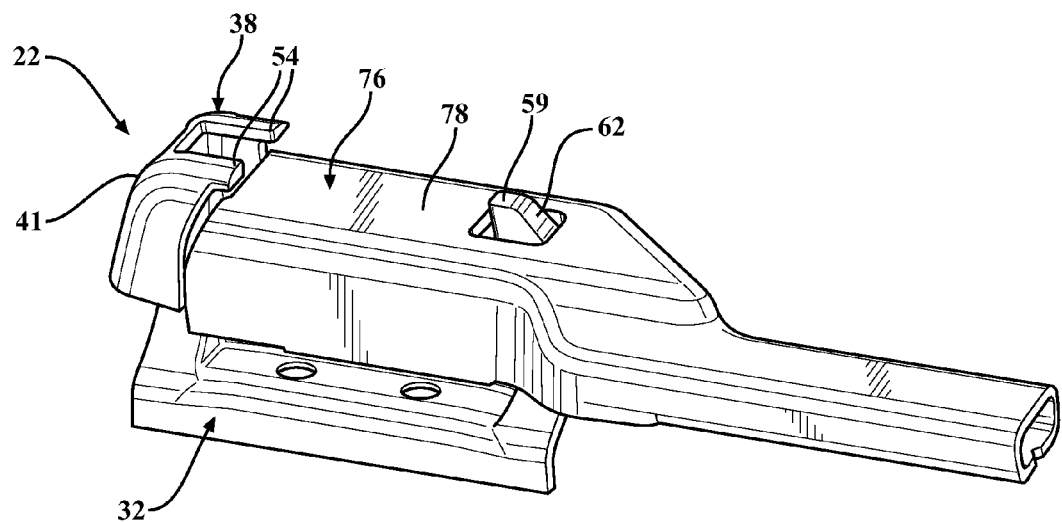
FIG. 5 is a perspective view of the connecting assembly of FIG. 3 engaged with a 22 mm bayonet-style wiper arm.

Referring now to FIG. 5, the joint part 38 is shown in locking engagement with a 22 mm bayonet-style wiper arm 76. The 22 mm bayonet-style wiper arm 76 is engaged with the joint part 38 by aligning the inwardly extending legs of the wiper arm 76 with an underside of the lower ledge 66 (shown in FIG. 3) such that the legs wrap around and engage with a lower surface of the lower ledge 66 and urging the joint part 38 rearwardly. Similar to the 19 mm sized wiper arm, the ramped surface 62 (shown in FIG. 3) of the button 59 automatically pivots downwardly when contacted by a front edge of the wiper arm 76 and then snaps upwardly into a hole in a top wall 78 of the wiper arm 76. Unlike the 19 mm sized wiper arm, when engaged with the 22 mm sized bayonet-style wiper arm 76, the button 59 projects above the top wall 78 of the wiper arm 76. The joint part 38 may be detached from the 22 mm bayonet-style wiper arm 76 by simply pressing the button 59 downwardly through the hole in the top wall 78 of the wiper arm 76 and sliding the joint part 38 forwardly and away from the wiper arm 76.

Figure 6:
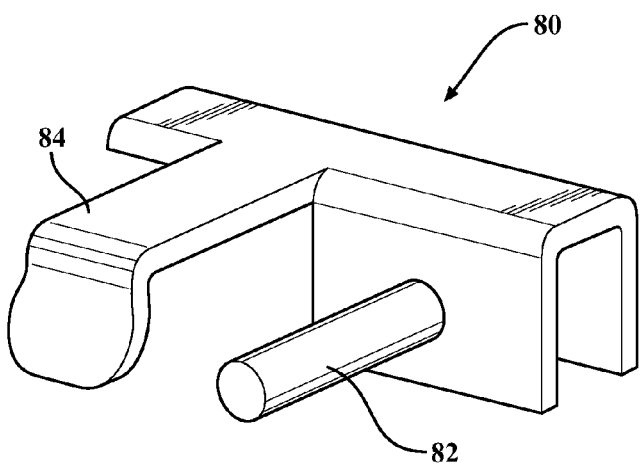
FIG. 6 is a perspective view of a side pin-style wiper arm.
Figure 7:
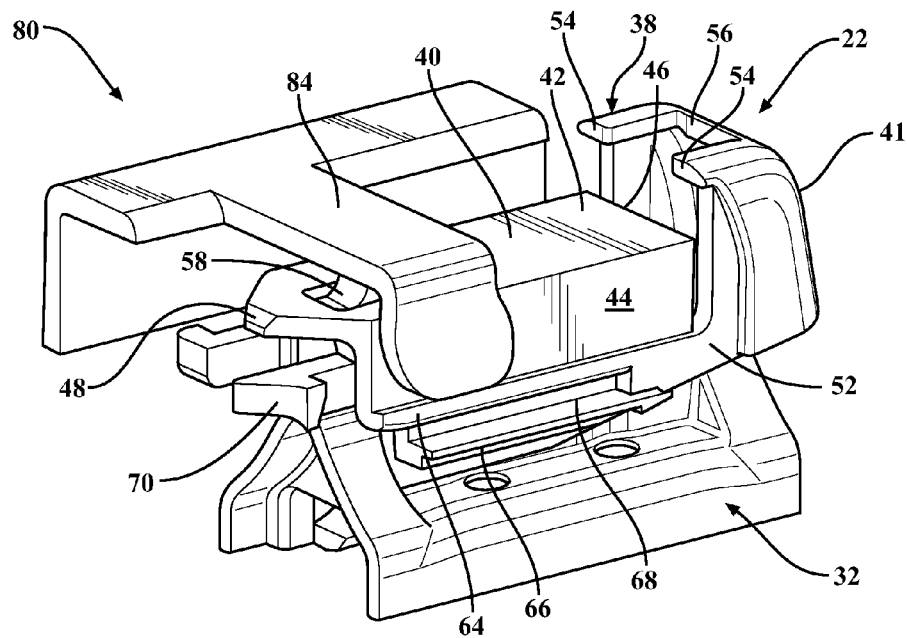
FIG. 7 is a perspective view of the connecting assembly of FIG. 3 engaged with the side pin-style wiper arm of FIG. 6.

Referring now to FIGS. 6 and 7, the joint part 38 is also configured for engagement with a side pin-style wiper arm 80. The side pin-style wiper arm 80 is engaged with the joint part 38 by inserting a pin 82 on the wiper arm 80 into the through hole 36 (shown in FIG. 3) on the projection 34 (also shown in FIG. 3) of the base 32 and pivoting the joint part 38 relative to the wiper arm 80 until an extension 84 on the wiper arm 80 contacts the top 42 of the main body portion 40. The joint part 38 may be detached from the side pin-style wiper arm 80 by reversing this process. The size of the side pin-style wiper arm 80 may either be 19 mm or 22 mm.

Figure 8:
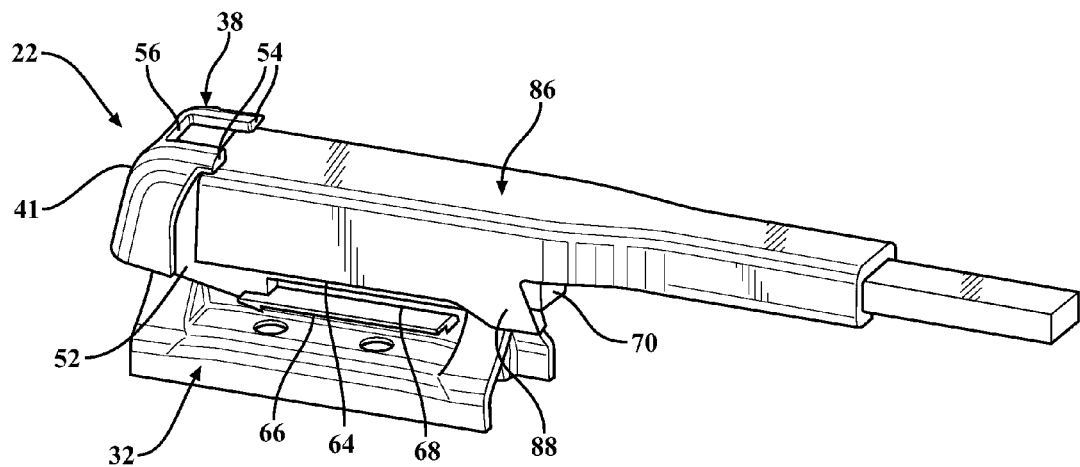
FIG. 8 is a perspective view of the connecting assembly of FIG. 3 engaged with a top lock-style wiper arm.

Referring now to FIG. 8, the joint part 38 is shown in locking engagement with a top lock-style wiper arm 86. During the attachment process, locking lugs 70 are received within a pair of legs 88 on the side walls of the wiper arm 86, and the joint part 38 is pivoted upwardly relative to the wiper arm 86. A tongue (not shown) on a front edge of the wiper arm 86 automatically urges the nose portion 41 of the joint part 38 forwardly to pivot the nose portion 41 about the resilient hinge 52 until the tongue passes through the U-shaped slot 56, thereby allowing the locking tangs 54 on the nose portion 41 to snappily lock into engagement with the front edge of the wiper arm 86. When properly engaged with the top lock-style wiper arm 86, upper surface of the upper ledges 64 contact and support bottom edges of the wiper arm 86. The joint part 38 may be detached from the top lock-style wiper arm 86 by urging the nose portion 41 forwardly to disengage the locking tangs 54 from the front edge of the wiper arm 86, pivoting the joint part 38 away from the wiper arm 86 and disengaging the locking lugs 70 of the joint part 38 from the legs 88 of the wiper arm 86.

Figure 9:
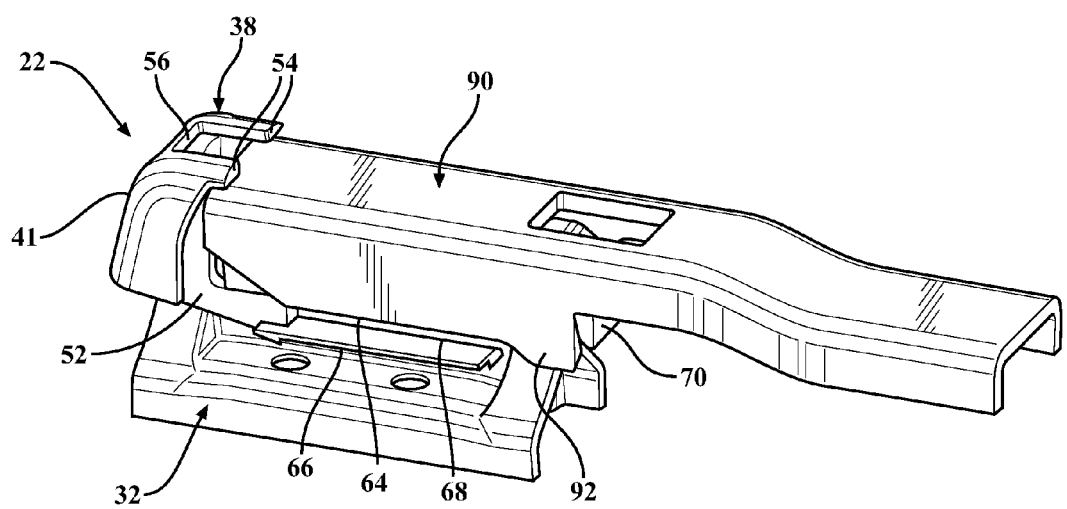
FIG. 9 is a perspective view of the connecting assembly of FIG. 3 engaged with a top lock with window-style wiper arm.

Referring now to FIG. 9, the joint part 38 is shown in locking engagement with a top lock with window-style wiper arm 90. Similar to the top lock-style wiper arm, the attachment process involves receiving the locking lugs 70 within a pair of legs 92 on the side walls of the wiper arm 90 and pivoting the joint part 38 upwardly relative to the wiper arm 90. A tongue (not shown) on a front edge of the wiper arm 90 automatically urges the nose portion 41 of the joint part 38 forwardly to pivot the nose portion 41 about the resilient hinge 52 until the tongue passes through the U-shaped slot 56, thereby allowing the locking tangs 54 to snappingly lock into engagement with the front edge of the wiper arm 90. The joint part 38 may be detached from the top lock with window-style wiper arm 90 by urging the nose portion 41 forwardly to disengage the locking tangs 54 from the front edge of the wiper arm 90, pivoting the joint part 38 away from the wiper arm 90 and disengaging the locking lugs 70 of the joint part 38 from the legs 92 of the wiper arm 90.

Obviously, many modifications and variations of the present invention are possible in light of the above teachings and may be practiced otherwise than as specifically described while within the scope of the appended claims.

What is claimed is:

1. A windscreen wiper device, comprising:
   a longitudinally extending wiper blade of an elastic material for sealing against a windscreen;
   a carrier element operatively supporting and biasing said wiper blade into a pre-curved configuration;
   a connecting assembly including a base which is engaged with at least one of said wiper blade and said carrier element and a joint part which is pivotally connected with said base and is adapted to directly secure with a range of different styles of oscillating wiper arms;
   said joint part being made as one integral piece and including a main body portion and a nose portion;
   said main body portion being generally U-shaped in cross-section and extending longitudinally from a front end to a back end and having a top and a pair of sides,
   a resilient tongue formed into said top and having a button protruding upwardly therefrom for engaging within an opening of a bayonet-style wiper arm;
   said nose portion being hingedly connected with said front end of said main body portion at a resilient hinge and including a pair of locking tangs spaced vertically from said resilient hinge for lockingly engaging a front edge of at least one style of a top lock-style wiper arm;
   a pair of locking lugs extending from said back end of said main body portion opposite of said nose portion for receiving legs of the top lock-style wiper arm; and
   said sides of said main body portion presenting a pair of ledges which are spaced vertically from one another to present a groove between said ledges.

2. The windscreen wiper device as set forth in claim 1 wherein said button on said resilient tongue extends has a ramped surface which faces longitudinally towards said locking lugs to provide said button with a shark fin-like shape.

3. The windscreen wiper device as set forth in claim 1 wherein said resilient tongue is interconnected with said top of said main body portion adjacent said back end and extends longitudinally towards said front end.

4. The windscreen wiper device as set forth in claim 1 wherein said locking lugs are interconnected with said back end of said main body portion via longitudinally extending legs.

5. The windscreen wiper device as set forth in claim 1 wherein said base presents a pair of laterally extending projections and wherein each of said projections is generally circular in shape and presenting an outer bearing surface and wherein said side walls of said main body portion of said joint part present openings which receive said projections on said base to establish said pivot.

6. The windscreen wiper device as set forth in claim 5 wherein at least one of said projections includes a through hole to present an inner bearing surface for receiving a pin of a side pin-style wiper arm.

7. The windscreen wiper device as set forth in claim 1 wherein said locking tangs on said nose portion are spaced laterally from one another on opposite sides of a U-shaped slot.

8. The windscreen wiper device as set forth in claim 1 wherein said carrier element includes a pair of longitudinally extending flexors.

9. The windscreen wiper device as set forth in claim 8 wherein neighboring ends of said flexors are interconnected with one another by end caps.

10. The windscreen wiper device as set forth in claim 9 further including a pair of subspoilers extending longitudinally between said connecting assembly and said end caps.

11. A windscreen wiper device, comprising:
    a longitudinally extending wiper blade of an elastic material for sealing against a windscreen;
    a carrier element operatively supporting and biasing said wiper blade into a pre-curved configuration;
    a connecting assembly including a base which is engaged with at least one of said wiper blade and said carrier element and a joint part which is pivotally connected with said base and is adapted to directly secure with a range of different styles of oscillating wiper arms;
    base including a pair of laterally extending projections and wherein at least one of said projections includes a through hole;
    said joint part being made as one integral piece and including a main body portion and a nose portion;
    said main body portion extending longitudinally from a front end to a back end and having a top and a pair of sides, said sides including openings which are shaped to receive said projections of said base for pivotally connecting said joint part with said base;
    a resilient tongue formed into said top and having a button protruding upwardly therefrom;
    said nose portion being hingedly connected with said front end of said main body portion at a resilient hinge and including a pair of locking tangs spaced vertically from said resilient hinge;
    a pair of locking lugs extending laterally on opposite sides of said joint part; and
    said sides of said main body portion presenting a pair of ledges which are spaced vertically from one another to present a groove between said ledges.

12. The windscreen wiper device as set forth in claim 11 wherein said resilient tongue is interconnected with said top of said main body portion adjacent said back end and extends longitudinally towards said front end.

13. The windscreen wiper device as set forth in claim 11 wherein said locking tangs on said nose portion are spaced laterally from one another on opposite sides of a U-shaped slot.

14. The windscreen wiper device as set forth in claim 11 wherein said locking tangs on said nose portion are spaced laterally from one another on opposite sides of a U-shaped slot.

15. The windscreen wiper device as set forth in claim 11 wherein said carrier element includes a pair of longitudinally extending flexors.

\* \* \* \* \*